United States Patent
Robles-Kelly et al.

(10) Patent No.: US 10,356,336 B2
(45) Date of Patent: Jul. 16, 2019

(54) AUTOMATIC EXPOSURE CONTROL FOR CAMERAS

(71) Applicant: NATIONAL ICT AUSTRALIA LIMITED, Eveleigh, NSW (AU)

(72) Inventors: Antonio Robles-Kelly, Eveleigh (AU); Ahmed Sohaib, Eveleigh (AU); Nariman Habili, Eveleigh (AU)

(73) Assignee: NATIONAL ICT AUSTRALIA LIMITED, Eveleigh, New South Wales (AU)

( * ) Notice: Subject to any disclaimer, the term of this patent is extended or adjusted under 35 U.S.C. 154(b) by 0 days.

(21) Appl. No.: 14/779,862

(22) PCT Filed: Mar. 26, 2014

(86) PCT No.: PCT/AU2014/000316
§ 371 (c)(1),
(2) Date: Sep. 24, 2015

(87) PCT Pub. No.: WO2014/153603
PCT Pub. Date: Oct. 2, 2014

(65) Prior Publication Data
US 2016/0065859 A1     Mar. 3, 2016

(30) Foreign Application Priority Data

Mar. 28, 2013 (AU) ................. 2013901071

(51) Int. Cl.
*H04N 5/235* (2006.01)
*G03B 7/00* (2014.01)
(Continued)

(52) U.S. Cl.
CPC .......... *H04N 5/243* (2013.01); *H04N 5/2351* (2013.01); *H04N 5/2353* (2013.01); *H04N 5/355* (2013.01);
(Continued)

(58) Field of Classification Search
None
See application file for complete search history.

(56) References Cited

U.S. PATENT DOCUMENTS

| 2002/0071049 A1 | 6/2002 | Bell et al. |
| 2002/0080247 A1 | 6/2002 | Takahashi et al. |

(Continued)

FOREIGN PATENT DOCUMENTS

| WO | WO 2009/128065 | 10/2009 |

OTHER PUBLICATIONS

International Search Report and the Written Opinion of the International Searching Authority, PCT/AU2014/000316, Australian Patent Office, dated Apr. 2014, 9 pages.

(Continued)

*Primary Examiner* — Stephen P Coleman (57) ABSTRACT

This disclosure concerns the determination of improved exposure parameters of an image capturing device, such as a multi-spectral or hyper-spectral camera. A processor receives or determines image values for multiple points of an image and receives first one or more exposure parameters that were used to generate the image values. The processor then determines a distribution of the image values. For each point of the image data the processor then determines an enhanced value by equalizing the distribution of the image values. Finally, the processor determines the one or more improved exposure parameters of the image capturing device, such that the one or more improved exposure parameters adjust the received or determined image values towards the enhanced image values. When the exposure parameters are used for capturing a further image, the further image will be enhanced.

13 Claims, 3 Drawing Sheets

(51) Int. Cl.
*H04N 5/243* (2006.01)
*H04N 5/355* (2011.01)
*H04N 5/361* (2011.01)
*H04N 9/04* (2006.01)
*G01J 3/28* (2006.01)

(52) U.S. Cl.
CPC ............ *H04N 5/361* (2013.01); *H04N 9/045* (2013.01); *G01J 3/2803* (2013.01)

(56) References Cited

U.S. PATENT DOCUMENTS

| | | |
|---|---|---|
| 2004/0085475 A1 | 5/2004 | Skow et al. |
| 2004/0239798 A1 | 12/2004 | Nayar et al. |
| 2005/0057666 A1 | 3/2005 | Hu et al. |
| 2006/0114333 A1 | 6/2006 | Gokturk et al. |
| 2007/0263097 A1 | 11/2007 | Zhao et al. |
| 2009/0073287 A1 | 3/2009 | Shimizu |
| 2009/0086046 A1 | 4/2009 | Reilly et al. |
| 2011/0019032 A1 | 1/2011 | Pinsky et al. |
| 2012/0105672 A1 | 5/2012 | Doepke et al. |

OTHER PUBLICATIONS

Extended European Search Report, European Application No. 14774199.5, European Patent Office, dated Sep. 2016, 8 pages.

AUTOMATIC EXPOSURE CONTROL FOR CAMERAS

CROSS-REFERENCE TO RELATED APPLICATIONS

The present application is related to International (PCT) application PCT/AU2009/000793 filed 19 Jun. 2009, entitled "Compact Representation of a Reflectance Spectrum" and published as WO 2009/152583 the content of which is incorporated herein by reference.

The present application is related to International (PCT) application PCT/AU2010/001000 filed 6 Aug. 2010, entitled "Illumination Spectrum Recovery" and published as WO 2011/026167 the content of which is incorporated herein by reference.

The present application is related to International (PCT) application PCT/AU2011/000458 filed 20 Apr. 2011, entitled "Shape and Photometric Invariants Recovery from Polarisation Images" and published as WO 2011/130793 the content of which is incorporated herein by reference.

The present application is related to U.S. application Ser. No. 13/207,016 filed 10 Aug. 2011, entitled "Decomposing hyperspectral or multispectral imaging data" and published as US2013/0039580 the content of which is incorporated herein by reference.

TECHNICAL FIELD

This disclosure concerns the determination of exposure parameters of an image capturing device. In particular the invention concerns, but is not limited to, methods, systems and software for determining one or more improved exposure parameters of an image capturing device.

BACKGROUND ART

The human eye has an ability to perceive a wide dynamic range from very dark to extremely bright. In this respect, the human eye outperforms most modern cameras. As a result, cameras, which have a limited dynamic range, need to adapt to different scenarios, such that more light is captured in dark scenarios while the light is limited in bright scenarios. This is referred to exposure control.

Figure 1:
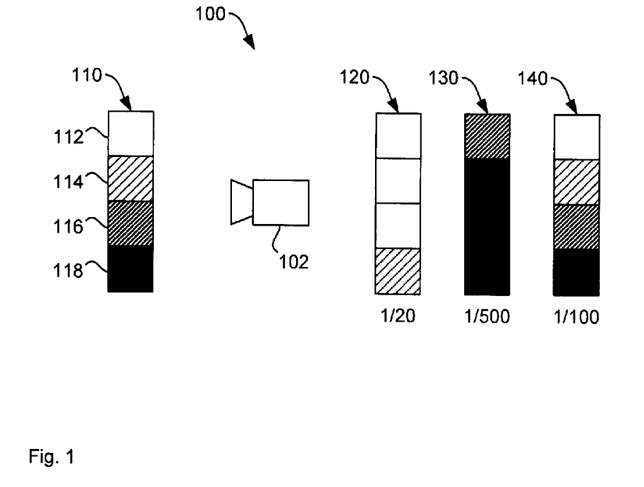

FIG. 1 illustrates an experimental setup 100 where a camera 102 takes a photo of a pattern 110. The pattern 110 comprises a white square 112, a light grey square 114, a dark grey square 116 and a black square illuminated by a light source (not shown).

A first output pattern 120 shows the captured output image where the camera 102 uses a shutter speed of 1/20. It can be seen that the white square 112, the light grey square 114 and the dark grey square 116 are captured as pure white and only the black square 118 is captured in light grey. The first output pattern is too bright and therefore referred to as overexposed.

In contrast, a second output pattern 130 shows the captured output image where the camera 102 uses a shutter speed of 1/500. It can be seen that the black square 118, the dark grey square 116 and the light grey square 114 are captured in black while only the white square 112 is captured in dark grey. The second output pattern is too dark and therefore referred to as underexposed.

A third output pattern 140 is correctly exposed and the optimal shutter speed of the camera is 1/100.

While the correct exposure can be found by a manual process, it is difficult to accurately determine the optimal exposure automatically.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

DISCLOSURE OF INVENTION

In a first aspect there is provided a method for determining one or more improved exposure parameters of an image capturing device, the method comprising:
(a) receiving or determining image values for multiple points of an image;
(b) receiving first one or more exposure parameters that were used to generate the image values;
(c) determining a distribution of the image values;
(d) determining for each point of the image data an enhanced value by equalising the distribution of the image values; and
(e) determining the one or more improved exposure parameters of the image capturing device, such that the one or more improved exposure parameters adjust the received or determined image values towards the enhanced image values.

It is an advantage that the improved exposure parameters are determined such that the image values are adjusted towards the enhanced image values. As a result, if the exposure parameters are used for capturing a further image, the further image will be enhanced.

Determining the one or more improved exposure parameters may comprise updating the first one or more exposure parameters with the improved exposure parameters.

The method may further comprise capturing an image using the improved exposure parameters.

The first one or more exposure parameters and the improved one or more exposure parameters may be one or more of
shutter timing,
aperture, and
gain.

Determining the one or more improved exposure parameters may comprise optimising a difference between the received or determined image values and the enhanced values.

Optimising the difference may be based on a box-constrained least squares method.

Step (a) may comprise receiving wavelength indexed spectral data comprising an intensity value for each wavelength index and each of the multiple points of the image data.

The one or more improved exposure parameters may comprise an exposure parameter for each wavelength index.

The one or more improved exposure parameters may comprise one exposure parameter for each of multiple sets of wavelength indices.

Step (a) may further comprise determining the image values based on the intensity values.

The image values may represent the total power of the intensity values.

The total power may be based on a photopic luminous efficiency function.

The total power may be a sum of the intensity values for each wavelength index weighted by the photopic luminous efficiency function for that wavelength index.

The method may further comprise determining multiple patches of the image data and selecting a subset of points of the image for each patch.

In a second aspect there is provided software, that when installed on a computer causes the computer to perform the method of the first aspect.

In a third aspect there is provided a computer system for determining one or more improved exposure parameters of an image capturing device, the system comprising:
 a first data port to receive or a processor to determine image values for multiple points of an image;
 a second data port to receive first one or more exposure parameters that were used to generate the image values; and
 a processor to
  determine a distribution of the image values,
  determine for each point of the image data an enhanced value by
  equalising the distribution of the image values, and
  determine the one or more improved exposure parameters of the image capturing device, such that the one or more improved exposure parameters adjust the received or determined image values towards the enhanced image values.

In a fourth aspect there is provided an image capturing device comprising:
 an image sensor using first one or more exposure parameters to capture image data comprised of image values for multiple points of the image data;
 a data aggregator to determine a distribution of the image values;
 an equaliser to equalise the distribution of the image values thereby determining for each point of the image data an enhanced value; and
 an adjustor to adjust the received image values towards the enhanced image values thereby determining the one or more improved exposure parameters of the image capturing device that adjust the received image values towards the enhanced image values.

Optional features described of any aspect, where appropriate, similarly apply to the other aspects also described here.

BRIEF DESCRIPTION OF DRAWINGS

FIG. 1 illustrates an experimental setup.
An example will be described with reference to
FIG. 2 illustrates a computer system for determining one or more improved exposure parameters of an image capturing device.

BEST MODE FOR CARRYING OUT THE INVENTION

It is emphasised here that the determination of exposure parameters of an image capturing device is different to exposure correction in image processing. Exposure correction in image processing uses the available image data and aims to extract the maximum amount of visual information from that image data. Exposure control of image capturing devices on the other hand aims at operating the device at the optimal operating point so that the image data represents what can be maximally achieved with the available hardware.

Figure 2:
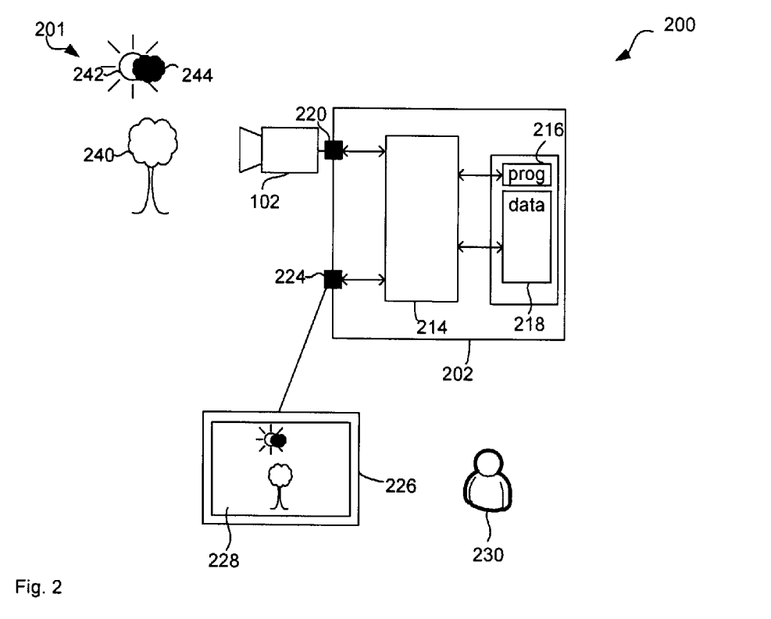

FIG. 2 illustrates a computer system 200 for determining one or more improved exposure parameters of an image capturing device, such as camera 102 capturing images of scene 201. The computer system 200 comprises computer 202, which includes a processor 214 connected to a program memory 216, a data memory 218, a communication port 220 and a user port 224. A display device 226 displays the image 228 to a user 230. Software stored on program memory 216 causes the processor 214 to perform the method in FIG. 3, that is, the processor receives image data from camera 102 and determines improved exposure parameters. The processor may then provide the improved exposure parameters to camera 102 via data port 220.

In this example, the scene comprises a tree 240 illuminated by the sun 242 which may be partly occluded by a cloud 244 causing changing illumination conditions. The computer system 200 is used to monitor plant growth by capturing hyperspectral images extracting material spectra from the image data as described in United States patent application published as US 2013/0039580 the content of which is incorporated herein by reference. It is important that the full dynamic range of the camera is used and no clipping occurs, which means that the exposure parameters need to be adjusted continuously to account for the change in illumination conditions. In one example, some patches of the image are more useful for extracting material spectra and therefore, these patches may be selected as the point of the image data for improving exposure parameters The image capturing device 102 controls the influx of light or other radiation by one or more exposure parameters. In one example, the image capturing device 102 has a shutter and the one or more exposure parameters include a shutter speed that indicates the time for the shutter is open and allows the light to reach the sensor. In another example, an exposure parameter is the gain, which is the electronic amplification of photon count in a CCD image sensor. The gain may be expressed in terms of ISO values, such as ISO 100 or ISO 200. In yet another example, where an aperture is mounted in front of the sensor, the opening of the aperture may also be an exposure parameter. Of course, other parameters, such as filter settings, that control the influx of light or other radiation, or other parameters that control the conversion of light or radiation to intensity values may also be used as exposure parameters.

In one example, the image capturing device 102 provides the image data as a stream of binary values, such as an RAW image file. The image capturing device 102 may comprise a CCD or CMOS sensor with integrated image processing capabilities, such as demosaicing.

Although the computer 202 is shown separately, it is to be understood that the computer 202 may be integrated into the camera or even into a single chip with the image sensor. The communication of the exposure parameters may be on-chip in case of gain or within the camera to the optical system in case of aperture and shutter speed.

The processor 214 receives data from data memory 218 as well as from the communications port 220 and the user port 224, which is connected to a display 226 that shows a visual representation 228 of the image to an operator 220. The processor 214 receives image data from the camera 102 via communications port 220, such as by using a proprietary or standard communications protocol, such as USB or firewire, a Wi-Fi network according to IEEE 802.11 or a LAN connection. The Wi-Fi network may be an decentralised ad-hoc network, such that no dedicated management infrastructure, such as a router, is required. The processor 214 may receive image data and exposure parameters via the same data port or via different data ports.

Although communications port 220 and user port 224 are shown as distinct entities, it is to be understood that any kind of data port may be used to receive data, such as a network connection, a memory interface, a pin of the chip package of processor 214, or logical ports, such as IP sockets or parameters of functions stored on program memory 216 and executed by processor 214. These parameters may be handled by-value or by-reference in the source code. The processor 214 may receive data through all these interfaces, which includes memory access of volatile memory, such as cache or RAM, or non-volatile memory, such as an optical disk drive, hard disk drive, storage server or cloud storage. The computer system 200 may further be implemented within a cloud computing environment.

While the example in FIG. 2 includes a camera 102, it is to be understood that any image capturing device may be used. In particular, an optical image sensor with or without optical lenses may be used as well as an X-ray detector or other image capturing device, which may be useful for machine vision only. Further, monochromatic devices as well as colour devices may be used as camera 102. Even further, hyperspectral cameras with a large number of bands, such as 1000, may be used.

Figure 3:
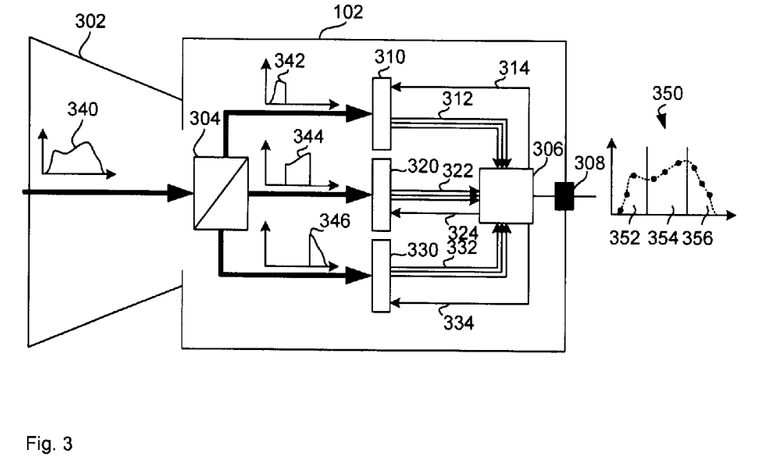
FIG. 3 illustrates a multispectral camera in more detail.

FIG. 3 illustrates camera 102 in more detail. In this example, camera 102 is a hyperspectral Charge Coupled Device (CCD) camera.

A CCD is a device that converts the photons from a scene into a digital count. The ratio of the incoming photons to the number of photoelectrons produced is called the quantum efficiency. In CCDs, these photoelectrons are converted into a numerical intensity value, usually referred to as data number or simply count. The gain of the CCD is defined as the conversion factor between the produced electrons and the count. Note that, if we allow more photons to reach the CCD by gradually increasing the exposure, we will find that the mean count of the CCD will increase linearly in the beginning, but will become asymptotic towards the end. Hence, there is a strong correlation between exposure value and image quality.

Theoretically, if the shutter is closed and we capture an image with a short exposure time, there should not be any photons arriving at the CCD. However, in practice, the count is not null. This is due to the presence of dark current and CCD bias. Dark current is the small electric current flowing through the CCD when theoretically no photons are entering the camera. Dark current is dependent on the temperature of the CCD, where a high CCD temperature will result in higher dark current and a lower temperature will result in lower dark current. CCD cameras also add some values to the pixel in each image, called bias. The bias should be subtracted from the image in order to properly estimate the photons and their conversion. Using the quantum efficiency, dark current and bias we can express the data number as follows $$O_{DN} = \frac{1}{g}(PQ_e t + It + B) \quad (1)$$

Here $O_{DN}$ is the observed data number, g is the gain, P is the rate of arriving photons, $Q_e$ is the quantum efficiency, t is the exposure time, I is the dark current and B is the bias. It is noted that in the present equations the exposure time is used as the exposure parameter. However, other exposure parameters, such as aperture and gain may equally be included. In order to optimise all three parameters, exposure time, aperture and gain, the parameter t representing the exposure time may be replaced by a general parameter r which may be represented as r=t*g*a, where g is the gain and a is the aperture parameter.

To remove the effect of dark current and bias, the common practice is to take an image with a closed shutter, such that the arrival photon rate tends to zero, i.e., $PQ_e t \to 0$. The new equation becomes $$O' = \frac{1}{g}(It + B) \quad (2)$$

If we subtract O' from $O_{DN}$ our observed data number will be $$O = \frac{1}{g}(PQ_e t) \quad (3)$$

This implies that the effects of dark current and bias can be safely ignored and removed automatically at startup or with a periodic dark current acquisition routine. Equation (3) may be used to determine an improved exposure parameter, such as exposure time, for the wavelength channels of a multispectral camera, assuming that the dark frame has already been subtracted.

Camera 102 has a lens system 302, a beam splitter 304 and a camera processor 306. Processor 306 may perform the functionality of processor 214 in FIG. 2 or may be a pre-processor that prepares the data for processor 214 in FIG. 4. Processor 306 sends the image data through output port 308. The camera 102 further comprises a first CCD sensor 310 connected to processor 306 by data line 312 and control line 314. Similarly, a second CCD sensor 320 is connected to processor 306 by second data line 322 and second control line 324 and a third CCD sensor 330 is connected to processor 306 by third data line 332 and third control line 334. Of course, other sensor types, such as CMOS sensors, may equally be used. In this example, the CCD sensors 310, 320 and 330 comprise a number of pixels, such as 1 million, to capture incoming light spectrum at different image locations. Each CCD sensor 310, 320 and 330 may comprise a Bayer filter so that different pixels detect light in a different wavelength and a demosaicing algorithm may be used to interpolate complete intensity values for each pixel.

When in use, light having an input light spectrum 340 passes through the lens system 302 and reaches beam splitter 304. The beam splitter 304 splits the light into three beams with beam spectra 342, 344 and 346, such that each beam spectrum is a section of the input light spectrum 340. In particular, beam spectrum 342 comprises the long wavelength band, that is, the red band, of input light spectrum 340. Beam spectrum 344 comprises the medium wavelength band, that is the green band, while beam spectrum 346 comprises the short wavelength band, that is, the blue band. Of course, the red band may include invisible infra-red light and the blue band may include invisible ultra-violet light. Each of the CCD sensors 310, 320 and 330 is adjusted for the particular light spectrum, such that, for example, CCD sensor 310 generates three samples in the red band but none in the green or blue band, and vice versa for CCD sensors 320 and 330.

The three beams with beam spectra 342, 344 and 346 reach the three CCD sensors 310, 320 and 330 respectively. Since the three beam spectra 342, 344 and 346 may have significantly different amplitudes, the three CCD sensors 310, 320 and 330 have individual exposure parameters, such as speed of individual shutters (not shown), gain or other parameters. The CCD sensors 310, 320 and 330 receive the exposure parameters via respective control lines 314, 324 and 334.

In this example, each of the CCD sensors 310, 320 and 330 generates three intensity values for three different wavelengths. Each intensity value is indexed by a wavelength index, which may be the wavelength itself, such as 400 nm, or an integer value counting from 0 to 8 in this example of 9 bands. Combining these intensity values results in a multispectral image I represented by wavelength indexed spectral data, which is shown for one pixel as sampled spectrum 350. For clarity of presentation FIG. 3 shows a multispectral example with 9 bands. However, hyperspectral cameras similarly create image data with a large number of bands, such as 1000.

Multispectral image I has dimensions (i,j,λ) where u=(i,j) are the row and column coordinates of the pixel u, respectively, and λ is the wavelength index. In some cameras, every wavelength channel has an associated exposure time. This is the case with starring array systems such as the OKSI hyperspectral cameras. Other systems may use a single exposure time for multiple wavelength indexed bands, such as sets of wavelength indices as explained further below. This is the case for multiple CCD systems such as the Fluxdata multispectral cameras. In one example, the intensity values are represented as binary numbers, such as 8 bit numbers, such that '0000 0000' represents zero light and '1111 1111' represents maximal brightness.

In the case of the Fluxdata camera FD-1665-MS7, seven wavelength channels are acquired from three CCDs but of course, other camera models with other configurations may equally be used. Each CCD 310, 320 and 330 has its own exposure setting. For the sake of generality, we assume that K wavelength channels are divided into N sets, where each set has its own exposure time. For cameras where every wavelength has its own exposure time (e.g., the OKSI systems), n is equal to 1. Let us assume that the pixel intensity values we get from a camera are actual data numbers. We can then rewrite Equation ((3)) as $$I(u,\lambda)=P(u,\lambda)Q(\lambda)T(c) \qquad (4)$$

where c=1, . . . , n is the index of the wavelength set $\Lambda_c$, u∈I and Λ∈$\Lambda_c$. In the equation above, I(u,λ) is the pixel intensity value at location u of channel λ, P(u,λ) is the rate of incoming photons at pixel u and wavelength λ, Q(λ) is the quantum efficiency of channel λ and T(c) is the exposure time for the set $\Lambda_c$. It is also worth noting in passing that the gain g is a constant that has been absorbed in the equation. Further, we can write $$P(u,\lambda)Q(\lambda)=V(u,\lambda) \qquad (5)$$

where λ∈$\Lambda_c$. Note that V(u,λ) can be calculated as follows $$V(u,\lambda)=I(u,\lambda)/T(c) \qquad (6)$$

Since CCD sensors 310, 320 and 330 each use particular exposure parameters, an exposure control method determines one exposure parameter for each of the sets of wavelength indices 352, 354, 356.

While it is a challenge to determine improved exposure parameters for single sensors, it can now be appreciated that using multiple sensors severely exacerbates the problem of determining improved exposure parameters.

Figure 4:
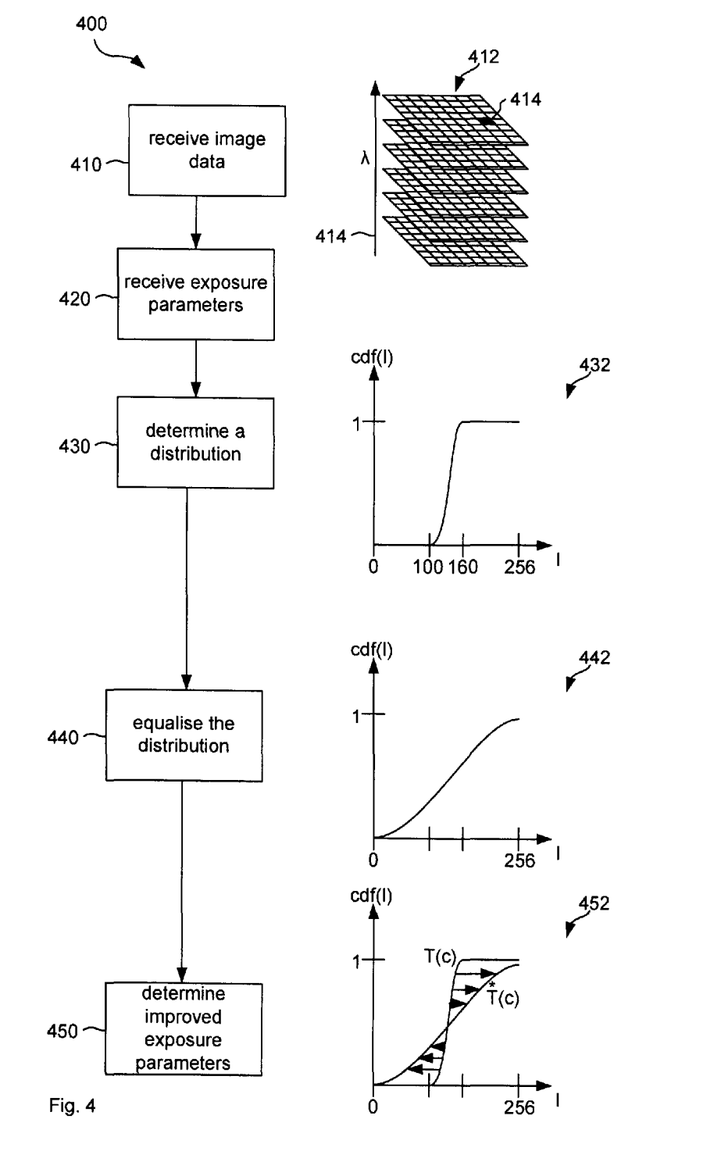
FIG. 4 illustrates a method for determining one or more improved exposure parameters of an image capturing device.

FIG. 4 illustrates a method 400 as performed by processor 214 for determining one or more improved exposure parameters of an image capturing device, such as camera 102.

The method commences by the processor 214 receiving or determining 410 image values for multiple points of an image. It is noted here that the term 'image values' is more general than 'intensity values' and image values may be determined based on the intensity values captured by camera 102.

In one example, the image values comprise one image value per pixel and are determined by a different device, such as within the camera 102, based on the captured intensity values.

In a different example, the processor 214 determines the image values by first receiving the intensity values as a multispectral image 412 comprising wavelength indexed spectral data with an intensity value for each wavelength index and each of the multiple points, such as pixel 414, of the image data represented as an image cube.

The intensity values and the image values may be received directly from camera 102 or from another source, such as data memory 218 or via the Internet.

In order to determine the image values, the processor computes the weighted spectral power Î(u) by multiplying the intensity value of each wavelength index, such as channel, by its respective photopic luminous efficiency function W(λ). This is done by adding the channels together to determine the total power and then normalizing the total power image values to between 0 and 1. That is $$\hat{I}(u)\Sigma_{c=1}{}^n\Sigma_{\lambda\in\Lambda_c}V(u,\lambda)W(\lambda)T(c) \qquad (7)$$

The result is a single image value Î(u) for each pixel u, which only depends on the pixel location and not on the wavelength index. Image values Î(u) may be seen as a greyscale version of the image, where the grey level represents the received power for each pixel.

Before, after or during the first step 410, the processor 214 receives 420 the exposure parameters that were used to generate the received or determined image values, that is, the exposure parameters that were used to capture the intensity values as described with reference to FIG. 3. In the example of a monochrome camera, generating the image values comprises capturing the intensity values, which can be used as image values without further processing. In the example of multispectral cameras with more than two colours or bands, generating image values comprises capturing the intensity values and determining the power values for each pixel. In one example, the processor 214 receives the exposure parameters from camera 102, such as embedded information in the image data, for example, EXIF data. In a different example, the processor 214 receives the exposure parameters from memory, such as data memory 218 or a register memory. The exposure parameters may have been previously determined by the processor 214 and are now available as the result of the improvement method.

The next step of method 400 is to determine 430 a distribution of the image values. Therefore, In one example, these values are counted in ascending order of value such as to create a distribution of image values, such as a cumulative distribution function (cdf) 422. In the example of discrete image value, such as 256 values represented by 8 bit, the processor 216 starts at image value 0 and counts all values with power value 0. The processor then moves to power value 1 and counts all values with power value 1 or less. This means, the processor 214 counts the number of pixels having the current power value and adds this number to the count of the previous step. In this example, the cdf is not normalised and the count for the highest power value is not '1' as in commond cdfs but equals the total number of points, such as pixels, of the image data.

Other distributions, such as a probability density function (pdf) or histogram may equally be used.

Then, the processor 214 equalises 440 the distribution of the image values to the histogram equalized power image $\overset{*}{I}$ given by $$\overset{*}{I} = \text{histeq}(\hat{I}) \quad (8)$$

An equalised distribution 442 is also shown in FIG. 4.

In one example, histeq(•) is the image equalisation function $$\overset{*}{I}(u) = \text{round}\left(\frac{cdf(u) - 1}{(M \times N) - 1} \times (L - 1)\right)$$

Where M×N gives the image's number of pixels (where M is width and N the height), such as 1628×1236 for a Sony ICX274 sensor, and L is the number of intensity levels used, such as 256.

Considering the example image data in FIG. 4, the exposure parameters generating image values of the example cdf 422 are not optimal since the entire range of intensities (vertical axis) is represented by only 60 different intensity levels (from 100 to 160 on the horizontal axis). However, 256 levels are available when using 8 bit numbers to represent different intensities. Visual inspection of the above mentioned greyscale image would show bright lights in light grey instead of white and dark shadows in dark grey instead of black.

For overexposed images or underexposed images such as illustrated in FIG. 1 with reference numerals 120 and 130, the cdf would look similar but parallel shifted to the right or the left, respectively. The equalisation step spreads the cdf over the entire available range of image values which results in enhanced values. Bright lights are now white and dark shadows are now black. Therefore, the function above determines for each point u of the image data an enhanced value.

Although the histeq(•) maximally equalises the distribution, it is to be understood that partly equalising the distribution is also possible. For example, the equalised distribution may not be spread over the entire available range but over a sub-range which is simply larger than the range of the original image data. The result is still enhanced values but not to a maximal extent.

In the example of a monochromatic sensor with only a single exposure parameter, it may be argued that this image processing step already provides a good output image. However, visual inspection of the enhanced values as a greyscale image will show abrupt changes of grayscale values since the limited number of used values are now spread over the entire range. For example, if the processor 214 applies the equalisation function to the overexposed output 120 in FIG. 1, the top square remains white and the bottom square, which is light grey in the output 120, is changed to black, which is the desired outcome. However, the two middle squares are as white as the top square and therefore remain white after the equalisation instead of light and dark grey as in the pattern 110. The image is said to be clipped and it is not possible to recreate the lost information by equalisation. It is possible, however, to determine an improved exposure parameter as described below and capture another image to gain the missing information.

In the example of a multi-spectral or hyperspectral image, the image values $\overset{*}{I}$ and $\hat{I}$ are derived from the intensity values in a one-way operation. After the equalisation step, it is difficult to re-create the intensity values from the equalised image values and therefore, the enhanced image values are of little use in this example. It is possible, however, to determine improved exposure parameters as described below and use these parameters to capture new image with better intensity values, that is, a more spread out power distribution.

It is noted here that since the maximum value after the equalisation is white, the proposed method naturally achieves white balance. This white balance is difficult to achieve otherwise in particular in systems with multiple exposure parameters for sets of wavelength indices as explained with reference to FIG. 3.

The next step of method 400 is determining 450 the one or more improved exposure parameters of camera 102.

To determine the improved exposure parameter, such as exposure time, processor 214 employs the ratio between the received image used for the equalisation above and the target exposure time. This leads to an updated exposure, which is given by the pre-set timings multiplied by the update ratio. To find the update ratio, we use bounded linear least squares (P. B. Stark and R. L Parker, "Bounded-variable least-squares: an algorithm and applications," 1993) in order to extremise the function $$J(\overset{*}{T}) = \sum_{u \in I} \left[ \overset{*}{I}(u) - \sum_{c=1}^{n} \sum_{\lambda \in \Lambda_c} V(u, \lambda) W(\lambda) \overset{*}{T}(c) \right]^2, \quad (9)$$

where $\overset{*}{T}(c)$ is the new exposure time. Since the improved exposure parameters $\overset{*}{T}(c)$ reduce the error between the received image values and the enhanced image values the improved exposure parameters adjusts the received image values towards the enhanced image values as illustrated by diagram 452.

Using Equation ((6)), we can rewrite Equation ((9)) as:

$$J(\overset{*}{r}) = \sum_{u \in I} \left[ \overset{*}{I}(u) - \sum_{c=1}^{n} \sum_{\lambda \in \Lambda_c} I(u, \lambda) W(\lambda) \overset{*}{r}(c) \right]^2 \quad (10)$$

where $\overset{*}{r}(c) = \overset{*}{T}(c)/T(c)$ is our update ratio.

Note that, to improve the stability, we have added a regularization term to Equation ((10)) so as to penalize the error term when the update ratios deviate from unity. This yields $$J(\overset{*}{r}) = \sum_{u \in I} \left[ \overset{*}{I}(u) - \sum_{c=1}^{n} \sum_{\lambda \in \Lambda_c} I(u, \lambda) W(\lambda) \overset{*}{r}(c) \right]^2 + \eta \sum_{c=1}^{n} \left[ 1 - \overset{*}{r}(c) \right]^2 \quad (11)$$

where η is a weighting scalar for the regularization term.

For the sake of efficiency, we can represent the image in a matrix format, where each column is a channel and represent the photopic function as a diagonal matrix. Let the $(u,\lambda)$ entry of B be the product of $I(u,\lambda)$ and $W(\lambda)$. We can represent Equation ((11)) as:

$$J(\dot{r}) = (\dot{1} - B\dot{r})^T(\dot{1} - B\dot{r}) + (\sqrt{n}[1 - \dot{r}]^T)(\sqrt{n}[1 - \dot{r}]) \quad (12)$$

Here 1 is a column vector of all ones. Equation ((12)) is of form $u^T u + v^T v$ which can be rewritten as:

$$\begin{bmatrix} u \\ v \end{bmatrix}^T \begin{bmatrix} u \\ v \end{bmatrix}$$

Hence, Equation (12) becomes $$J(\dot{r}) = \begin{bmatrix} \dot{1} - B\dot{r} \\ \sqrt{\eta}1 - \sqrt{\eta}\dot{r} \end{bmatrix}^T \begin{bmatrix} \dot{1} - B\dot{r} \\ \sqrt{\eta}1 - \sqrt{\eta}\dot{r} \end{bmatrix}$$

This allows us to minimize the cost function $$\min_{\dot{r}} \left\| \begin{bmatrix} \dot{1} \\ \sqrt{\eta}1 \end{bmatrix} - \begin{bmatrix} B \\ \sqrt{\eta}I \end{bmatrix} \dot{r} \right\|^2$$

Note that here, I is the identity matrix. As noted earlier, we require our update ratio $\dot{r}$ to be bounded, hence we use a boxed-constrained least squares method. If we assume $$d = \begin{bmatrix} \dot{1} \\ \sqrt{\eta}1 \end{bmatrix}, C = \begin{bmatrix} B \\ \sqrt{\eta}I \end{bmatrix}$$

and $x = \dot{r}$ then the minimization is given as $$\min_x \|Cx - d\|^2 \quad (13)$$
$$\text{s.t.} \quad \alpha \leq x \leq \beta$$

where α is the lower and β is the upper bound, respectively. Also, note that the exposure times cannot be negative. Thus, we introduce the constraint $\alpha \geq 0$.

The new exposure time is $$\dot{T}(c) = \dot{r}(c)T(c) \quad (14)$$

where T is the exposure time used as a pre-set for the input image.

In one example, the computational effort is reduced by selecting patches in the image and using the intensity values of only a single point of each patch.

In another example, the intensity values are to be used for the decomposition of material spectra as described in US2013/0039580. Therefore, processor 214 selects patches that are best suited for decomposition and improves the exposure for those patches.

The patch selection strategy is described in WO 2011/026167 and performed as follows. We first subdivide 112 the image into patches of equal size in a lattice-like fashion. For each patch, we fit 114 a two-dimensional hyperplane to the spectral data of radiance or reflectance vectors of the pixels in the patch. Next, we note that, in perfectly dichromatic patches, the wavelength-indexed radiance vector of each pixel lies perfectly in this hyperplane, i.e. the dichromatic plane. To allow for noise effect, we regard dichromatic patches as those containing a percentage of at least $t_p$ pixels whose radiance vectors deviate from their projection given by the Singular Value Decomposition (SVD) in (TOMINAGA, S., AND WANDELL, B. A. Standard surface-reflectance model and illuminant estimation. Journal of the Optical Society of America A 6 (April 1989), 576-584). We do this by setting an upperbound $t_a$ on the angular deviation from the dichromatic plane, where $t_p$ and $t_a$ are global parameters.

However, not all these patches may be useful for purposes of illumination spectrum recovery. This is due to the fact that perfectly diffuse surfaces do not provide any information regarding the illuminant spectrum. The reason being that, a spectral radiance vector space for this kind of surface is one-dimensional, spanned only by the wavelength-indexed diffuse radiance vector. On the other hand, the dichromatic model implies that the specularities have the same spectrum as the illuminant, where the specular coefficient can be viewed as a scaling factor solely dependent on the surface geometry.

Thus, for the recovery of the dichromatic model parameters, we only use highly specular patches by selecting 116 regions with the highest contrast amongst those deemed to have a uniform albedo. We recover the contrast of each patch by computing the variance of the mean radiance over the spectral domain. These highly specular patches provide a means to the recovery of the light spectrum L. This is due to the fact that, for highly specular surface patches with uniform albedo, the surface diffuse radiance vector and the illuminant vector span a hyperplane in the radiance space. This is a property in colour constancy. In one example, a patch size of 20×20 pixels is used.

It will be appreciated that the computer system 200 in FIG. 2 can be implemented in a number of different technologies. When implemented in hardware, such as an application specific integrated circuit (ASIC), different steps of the method 400 in FIG. 4 may be implemented as separate modules. In one example, the computer system 200 is an integrated image capturing device with an image sensor that uses the original exposure parameters to capture image data. As described earlier, the image data comprises image values, which includes intensity values or power values derived by the image sensor from the intensity values, for multiple points of the image data. A data aggregator determines the distribution of the image values and an equaliser module equalises the distribution. This equalisation yields the enhanced values, which are then used by an adjustor module to adjust the received image values to the enhanced image values. This adjustment also determines the improved exposure parameters which may be used by the image capturing device to capture further images.

It will be appreciated by persons skilled in the art that numerous variations and/or modifications may be made to the specific embodiments without departing from the scope as defined in the claims.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "estimating" or "processing" or "computing" or "calculating" or "generating", "optimizing" or "determining" or "displaying" or "maximising" or "equalising" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method for determining one or more improved exposure parameters of an image capturing device, the method comprising:
   (a) receiving image data for multiple points of an image, the image data comprising wavelength indexed spectral data comprising an intensity value for each wavelength index and each of the multiple points of the image data;
   (b) determining image values based on the intensity values, wherein the image values represent the total power of the intensity values;
   (c) receiving first one or more exposure parameters that were used to generate the image data;
   (d) determining distribution values indicative of a number of times each image value or range of image values occurs within the multiple points of the image;
   (e) determining for each point of the image an enhanced value by equalising the distribution values; and
   (f) determining the one or more improved exposure parameters of the image capturing device by optimizing a difference between the determined image values and the enhanced values, such that the one or more improved exposure parameters adjust the received or determined image values towards the enhanced image values.

2. The method of claim 1, wherein determining the one or more improved exposure parameters comprises updating the first one or more exposure parameters with the improved exposure parameters.

3. The method of claim 1, further comprising capturing an image using the improved exposure parameters.

4. The method of claim 1, wherein the first one or more exposure parameters and the improved one or more exposure parameters are one or more of shutter timing, aperture, and gain.

5. The method of claim 1 wherein optimising the difference is based on a box-constrained least squares method.

6. The method of claim 1, wherein the one or more improved exposure parameters comprise an exposure parameter for each wavelength index.

7. The method of claim 1, wherein the one or more improved exposure parameters comprise one exposure parameter for each of multiple sets of wavelength indices.

8. The method of claim 1, further comprising determining multiple patches of the image data and selecting a subset of points of the image for each patch.

9. A non-transitory computer readable medium with an executable program stored thereon that when executed causes a computer to perform the method of claim 1.

10. The method of claim 1, wherein the total power is based on a photopic luminous efficiency function.

11. The method of claim 10, wherein the total power is a sum of the intensity values for each wavelength index weighted by the photopic luminous efficiency function for that wavelength index.

12. A computer system for determining one or more improved exposure parameters of an image capturing device, the system comprising:
   a first data port to receive image data for multiple points of an image, the image data comprising wavelength indexed spectral data comprising an intensity value for each wavelength index and each of the multiple points of the image data;
   a second data port to receive first one or more exposure parameters that were used to generate the image data; and
   a processor to
   determine image values based on the intensity values, wherein the image values represent the total power of the intensity values,
   determine distribution values indicative of a number of times each image value or range of image values occurs within the multiple points of the image,
   determine for each point of the image an enhanced value by equalising the distribution values, and
   determine the one or more improved exposure parameters of the image capturing device by optimizing a difference between the determined image values and the enhanced values, such that the one or more improved exposure parameters adjust the received or determined image values towards the enhanced image values.

13. An image capturing device comprising:
   an image sensor using first one or more exposure parameters to capture image data comprised of image values, the image data comprising wavelength indexed spectral data comprising an intensity value for each wavelength index and each of the multiple points of image data;
   wherein the image values are based on the intensity values and the image values represent the total power of the intensity values;
   a data aggregator to determine distribution values indicative of a number of times each image value or range of image values occurs within the multiple points of the image data;
   an equaliser to equalise the distribution of values thereby determining for each point of the image data an enhanced value; and
   an adjustor to adjust the received image values towards the enhanced image values thereby determining the one or more improved exposure parameters of the image capturing device that adjust the received image values towards the enhanced image values;
   wherein determining the one or more improved exposure parameters of the image capturing device comprises optimizing a difference between the determined image values and the enhanced values.

\* \* \* \* \*